(12) United States Patent
Sheng et al.

(10) Patent No.: US 11,153,584 B2
(45) Date of Patent: Oct. 19, 2021

(54) METHODS, APPARATUSES AND DEVICES FOR PANORAMIC VIDEO TRANSCODING

(71) Applicant: ALIBABA GROUP HOLDING LIMITED, Grand Cayman (KY)

(72) Inventors: Xiaojie Sheng, Hangzhou (CN); Yuxing Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/506,870

(22) Filed: Jul. 9, 2019

(65) Prior Publication Data

US 2019/0335187 A1    Oct. 31, 2019

Related U.S. Application Data

(63) Continuation of application No. PCT/CN2017/119195, filed on Dec. 28, 2017.

(30) Foreign Application Priority Data

Jan. 9, 2017    (CN) .................. 201710013873.X (51) Int. Cl.
*H04N 19/40* (2014.01)
*H04N 19/14* (2014.01)
(Continued)

(52) U.S. Cl.
CPC ............... *H04N 19/40* (2014.11); *G06T 1/20* (2013.01); *H04N 19/14* (2014.11); *H04N 19/42* (2014.11); *H04N 19/597* (2014.11)

(58) Field of Classification Search
CPC ..... H04N 19/172; H04N 19/14; H04N 19/597; H04N 21/2343; H04N 19/40;
(Continued)

(56) References Cited

U.S. PATENT DOCUMENTS 8,553,028 B1    10/2013   Urbach
10,127,624 B1 *  11/2018   Lassahn ................. G06F 12/02
(Continued)

FOREIGN PATENT DOCUMENTS

CN          102036043 A          4/2011
CN          103905741 A          7/2014
(Continued)

OTHER PUBLICATIONS

PCT International Search Report dated Apr. 3, 2018, issued in corresponding International Application No. PCT/CN2017/119195 (2 pages).
(Continued)

*Primary Examiner* — Neil R Mikeska
(74) *Attorney, Agent, or Firm* — Finnegan, Henderson, Farabow, Garrett & Dunner, LLP (57) ABSTRACT

Panoramic video transcoding methods, devices, and apparatuses are provided. The method involves a central processing unit (CPU) and a graphics processing unit (GPU) and includes decoding a panoramic video; mapping, at least partly using the GPU, the decoded video data to N visual angles, to obtain N channels of video data, in which N is more than 1; encoding the N channels of video data respectively to obtain N channels of video streams; and slicing and packing the N channels of video streams respectively.

20 Claims, 6 Drawing Sheets

(51) Int. Cl.
*H04N 19/42* (2014.01)
*H04N 19/597* (2014.01)
*G06T 1/20* (2006.01)

(58) Field of Classification Search
CPC .. H04N 19/42; H04N 19/156; H04N 21/4402; H04N 19/119; G06T 1/20
See application file for complete search history.

(56) References Cited

U.S. PATENT DOCUMENTS

| | | | |
|---|---|---|---|
| 10,354,690 B2 * | 7/2019 | Schulz | G06F 9/445 |
| 2011/0211036 A1 * | 9/2011 | Tran | G06F 3/005 |
| | | | 348/14.08 |
| 2012/0002004 A1 | 1/2012 | Free | |
| 2015/0124048 A1 | 5/2015 | King | |
| 2016/0088287 A1 * | 3/2016 | Sadi | G03B 35/08 |
| | | | 348/43 |
| 2017/0346817 A1 * | 11/2017 | Gordon | G02B 27/0172 |
| 2018/0012335 A1 * | 1/2018 | Adsumilli | G06T 3/4084 |
| 2018/0027181 A1 * | 1/2018 | Roulet | H04N 5/2253 |
| | | | 348/38 |
| 2018/0077409 A1 * | 3/2018 | Heo | H04N 13/122 |
| 2018/0089903 A1 * | 3/2018 | Pang | H04N 5/2258 |
| 2018/0152682 A1 * | 5/2018 | Wozniak | H04N 19/44 |
| 2018/0284876 A1 * | 10/2018 | Ray | H04N 7/0127 |
| 2019/0019267 A1 * | 1/2019 | Suresh | G06T 1/20 |
| 2019/0297363 A1 * | 9/2019 | Chirokov | H04N 19/597 |

FOREIGN PATENT DOCUMENTS

| | | |
|---|---|---|
| CN | 105791882 A | 7/2016 |
| CN | 105898315 A | 8/2016 |
| CN | 106162207 A | 11/2016 |
| CN | 106210726 A | 12/2016 |

OTHER PUBLICATIONS

PCT Written Opinion dated Apr. 3, 2018, issued in corresponding International Application No. PCT/CN2017/119195 (7 pages).
Chinese Supplementary Search Report issued in Chinese Application No. 201710013873, dated May 7, 2020 (1 page).
First Chinese Office Actin issued in Chinese Application No. 201710013873.X, dated May 28, 2019 (11 pages).
Second Chinese Office Actin issued in Chinese Application No. 201710013873.X, dated Jan. 19, 2020 (7 pages).

* cited by examiner

METHODS, APPARATUSES AND DEVICES FOR PANORAMIC VIDEO TRANSCODING

CROSS-REFERENCE TO RELATED APPLICATIONS

The present application claims priority to International Application No. PCT/CN2017/119195, filed Dec. 28, 2017, which claims priority to and the benefits of Chinese Patent Application No. 201710013873.X filed on Jan. 9, 2017 and entitled "PANORAMIC VIDEO TRANSCODING METHOD, APPARATUS AND DEVICE", both of which are incorporated herein by reference in their entireties.

TECHNICAL FIELD

The present disclosure relates to the field of computer application technologies, and in particular, to panoramic video transcoding methods, devices, and apparatuses.

BACKGROUND

With the increasing user demands on the definition and fluidity of Virtual Reality (VR) panoramic videos, how to reduce the bit rate while maintaining the resolution of the panoramic video has become an urgent problem to be solved in the field of VR technologies.

When viewing a panoramic video, users often only see a small part of the content in the spherical panoramic video at their visual angles. A common panoramic video, during transcoding, maintains the same resolution and definition at all visual angles. This leads to a high resolution even at the visual angle invisible to the users, resulting in a waste of bit rate during transcoding. In view of this, a method of mapping a panoramic video to multiple channels at different visual angles has been proposed, so that each channel of the mapped video has a high definition at a specific visual angle, and has descending definitions at parts gradually away from the specific visual angle. Therefore, the resolution of each channel of the mapped video is much lower than that of the original panoramic video, and thus the bit rate of the transcoding is also reduced.

SUMMARY

Embodiments of the present disclosure provide methods, devices, and apparatuses for panoramic video transcoding, which can meet requirements for VR video live broadcasting.

According to some embodiments of the present disclosure, methods for panoramic video transcoding are provided. One exemplary panoramic video transcoding method involving a central processing unit (CPU) and a graphics processing unit (GPU) includes: decoding a panoramic video; mapping, at least partly using the GPU, decoded video data to N visual angles, to obtain N channels of video data, in which N is more than 1; encoding the N channels of video data respectively to obtain N channels of video streams; and slicing and packing the N channels of video streams respectively.

According to some embodiments of the present disclosure, devices for panoramic video transcoding are provided. One exemplary panoramic video transcoding device having a central processing unit (CPU) and a graphics processing unit (GPU) includes a decoder configured to decode a panoramic video, a mapping circuit configured to map decoded video data to N visual angles, to obtain N channels of video data, in which N is more than 1 and at least a part of the mapping circuit is implemented by the GPU, an encoder configured to encode the N channels of video data respectively to obtain N channels of video streams, and a slicing and packing circuit configured to slice and pack the N channels of video streams respectively.

According to some embodiments of the present disclosure, processing apparatuses are provided. One exemplary processing apparatus includes a graphics processing unit (GPU) and a central processing unit (CPU), a memory, and one or more programs stored in the memory and executed by the GPU or the CPU to perform following operations: decoding a panoramic video; mapping, at least partly using the GPU, decoded video data to N visual angles, to obtain N channels of video data, in which N is more than 1; encoding the N channels of video data respectively to obtain N channels of video streams; and slicing and packing the N channels of video streams respectively.

According to some embodiments of the present disclosure, non-transitory computer-readable media are provided. One exemplary non-transitory computer-readable medium stores a set of instructions that is executable by at least one processor of an apparatus to cause the apparatus to perform a panoramic video transcoding method. The panoramic video transcoding method includes: decoding a panoramic video; mapping, at least partly using the GPU, decoded video data to N visual angles, to obtain N channels of video data, in which N is more than 1; encoding the N channels of video data respectively to obtain N channels of video streams; and slicing and packing the N channels of video streams respectively.

BRIEF DESCRIPTION OF THE DRAWINGS

To describe the technical solutions in the embodiments of the present disclosure or the prior art more clearly, the drawings that need to be used in the embodiments or the prior art are briefly introduced. It would be obvious that the drawings in the following description are merely some embodiments of the present disclosure, and those of ordinary skilled in the art may further obtain other drawings according to these drawings without creative efforts.

DETAILED DESCRIPTION

It is to be understood that both the foregoing general description and the following detailed description are examples and explanatory only and are not restrictive of the disclosed embodiments as claimed. The accompanying drawings constitute a part of this specification. The drawings illustrate several embodiments of the present disclosure and, together with the description, serve to explain the principles of the disclosed embodiments as set forth in the accompanying claims. Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

To make the objectives, technical solutions, and advantages of the present disclosure clearer, the present disclosure will be described below in detail with reference to the accompanying drawings and specific embodiments.

The terminologies used in the present disclosure are merely used for describing particular embodiments but are not intended to limit the present disclosure. Unless expressly and unequivocally limited to one referent in the context, the singular forms "a/an", "the", "this", and any singular use of any word, used in the present disclosure and appended claims are also intended to include plural referents.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the database may include A, or B, or C, or A and B, or A and C, or B and C, or A and B and C. Depending on the context, the term "if" used herein may be construed as "at the time of," "when," "while", "in response to," or "in response to the determination of". Similarly, depending on the context, the phrase "upon determining" or "upon detecting (the stated condition or event)" may be construed as "when determining" or "in response to the determination of" or "when detecting (the stated condition or event)" or "in response to the detection of (the stated condition or event)".

A concept of the present disclosure is to transform a pure central processing unit (CPU) based architecture implementation into a central processing unit-graphics processing unit (CPU-GPU) combination based architecture implementation.

Figure 1:
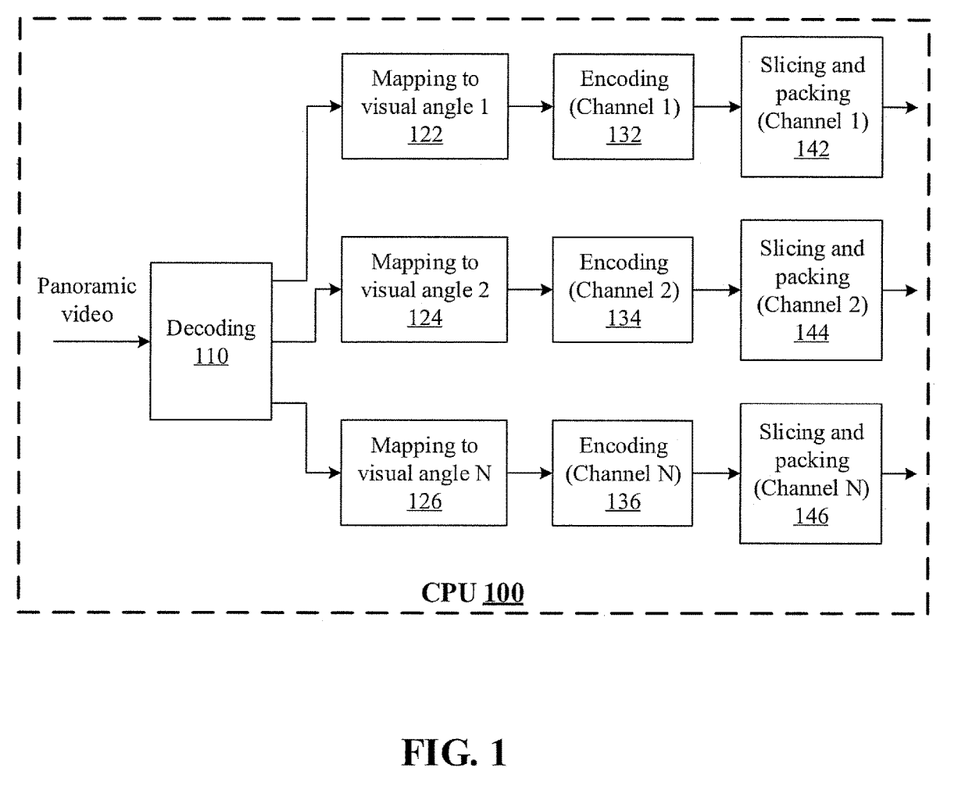
FIG. 1 is a schematic flowchart illustrating transcoding a panoramic video in a conventional transcoding system.

FIG. 1 is a schematic flowchart which illustrates transcoding a panoramic video in a conventional transcoding system. First, in operation 110, an original panoramic video is decoded. Then, in operations 122, 124, 126, the decoded panoramic video is mapped to N visual angles respectively to obtain N channels of panoramic video, in which N is a positive integer. Then, in operations 132, 134, 136, the N channels of panoramic video are encoded respectively. Then, in operations 142, 144, 146, encoded video streams are sliced and packed for output. However, in the above process, mapping and encoding the multiple channels of panoramic video respectively consume significant computing resources and bring tremendous burdens on a transcoding system currently deployed on a central processing unit (CPU) 100, such that it is difficult to achieve real-time processing. Therefore, it can only be used for VR video on demand (VOD), but cannot meet requirements for VR video live broadcasting.

Transcoding of a panoramic video refers to a process of converting a video code stream into another video code stream, to adapt to different network bandwidths, different terminal processing capacities, and different user requirements. The process of transcoding the panoramic video generally includes following processes: a decoding process, a mapping process, an encoding process, and a slicing and packing process.

The decoding process is performed on the panoramic video to decode the panoramic video into frames of images. The panoramic video may be obtained from a video source of the panoramic video, or may also be panoramic video data in a local storage.

The mapping process is performed to map the decoded video data to N visual angles, to obtain N channels of video data. The N visual angles are preset, and N is a preset positive integer, which is usually greater than or equal to 2. The operation of the mapping process generally includes mapping, frame-by-frame, a spherical panoramic video image to a two-dimensional plane image. In this mapping operation, different visual angle models are applied, so that the image mapped at a specific visual angle has a higher resolution at a region within the range of the visual angle. The resolutions gradually descend in regions away from the range of the visual angle. By mapping to N visual angles, one channel of the panoramic video is transformed into N channels of video data respectively at different visual angles.

The encoding process is performed to encode the N channels of video data respectively to obtain N channels of video streams.

The slicing and packing process is performed to slice and pack the N channels of video streams respectively for output.

The decoding process, the mapping process, and the encoding process bring a significant computing burden. Particularly, the mapping and the encoding processes require processing on N channels. Therefore, in the embodiments of the present disclosure, one or more parts or all of the decoding, the mapping, and the encoding processes are executed by a graphics processing unit (GPU). If one or more parts of the decoding, the mapping, and the encoding processes are executed by the GPU, remaining processes are still executed by the CPU. The slicing and packing process among them is executed by the CPU.

The GPU, for its powerful parallel computing capability and relatively low serial computing capability, is suitable for the mapping and the encoding processes involved in embodiments of the present disclosure. Therefore, the mapping and the encoding processes can be executed by the GPU. In some embodiments, the slicing and packing process may be less suitable to be executed by the GPU. In some embodiments, the CPU has a powerful serial computing capability and a relatively low parallel computing capability, so the slicing and packing process is quite suitable to be executed by the CPU. In addition to the CPU, other types of processors, such as a digital signal processor (DSP), etc., can also be used to execute operations performed by the CPU discussed above.

The decoding process may be executed by a decoding hardware acceleration circuit in the GPU. However, in some embodiments, due to limited processing capacity of the GPU, if the resolution of the panoramic video exceeds the processing capacity of the GPU, the decoding can be executed by the CPU. In some embodiments of the present disclosure, it can be determined that whether the resolution of the panoramic video is higher than a preset first threshold. The first threshold here refers to a highest resolution of the panoramic video that can be decoded by the GPU, which can be determined by a practical processing capacity of the GPU.

The mapping process can be executed, at least partly, using the GPU, by a computing circuit in the GPU. The mapping process here is to map the decoded video data to a specific visual angle through computation and conversion, which results in a large amount of computation. Generally, the GPU has a powerful image computing capability, thus having a greater image computing capability as compared with the CPU of the same price, or several times the price. Therefore, the mapping process may be executed by the GPU.

However, there may be a large number of visual angles need to be mapped such that mapping the decoded video data to M visual angles of the total N visual angles consumes almost all the resources of the computing circuit of the GPU. In such circumstances, the mapping process of the remaining (N-M) visual angles can be performed by the CPU. In some embodiments, the value of M may be an empirical value or an experimental value. For example, after experiments, it is guaranteed that the requirements for the real-time performance can be met when the decoded video data is mapped to M visual angles. If the requirements for the real-time performance cannot be met when the decoded video data is mapped to (M+1) visual angles, the value of M is taken as the number of the visual angles of which the mapping process are performed by the GPU. Alternatively, after experiments, it is determined that the overall processing rate is the highest when the decoded video data is mapped to M visual angles by the GPU and mapped to the remaining visual angles by the CPU. In such circumstances, the value of M is taken as the number of the visual angles of which the mapping process are performed by the GPU. Needless to say, various manners may also be adopted, which are not listed exhaustively herein.

Whether the requirements for the real-time performance are met can be reflected in a relationship between a processing rate of the mapping process performed by the GPU and an input frame rate of the decoded video data. For example, if the processing rate of the mapping process performed by the GPU is greater than or equal to the input frame rate, it is considered that the requirements for the real-time performance can be met; otherwise, the requirements for the real-time performance cannot be met. Alternatively, whether the requirements for the real-time performance are met can also be reflected in a status of a cache queue for caching the decoded video data. The decoded video data is sent to the cache queue. The computing circuit of the GPU reads, from the cache queue, the video data for the mapping process. If the congestion of the cache queue reaches a certain level, it can be considered that the requirements for the real-time performance cannot be met.

In addition to the empirical or experimental value, in some embodiments, the value of M may also be flexibly determined by the CPU according to the practical processing capacity of the GPU. For example, the CPU can monitor a resource occupancy rate of the GPU. If the resource occupancy rate reaches a preset resource occupancy rate threshold when the GPU performs the mapping process for the M visual angles, the CPU is configured to take over the mapping process for the remaining (N-M) visual angles.

The encoding process may be executed by an encoding hardware acceleration circuit of the GPU. The resolution of each channel of video data after the mapping is significantly reduced, and usually within the processing capacity of the GPU. However, in some embodiments, if the resolution of each channel of video data after the mapping still exceeds the processing capacity of the GPU, the CPU can perform the encoding of each channel of video data. In some embodiments of the present disclosure, whether the resolution of each channel of video data after the mapping is higher than a preset second threshold can be determined. The second threshold here refers to a highest resolution of the video data that can be encoded by the GPU at that time, and is determined by a practical processing capacity of the GPU.

In addition, even if the resolution of each channel of video data is within the processing capacity of the GPU, the encoding process to P channels of video data may consume almost all the resources of the encoding hardware acceleration circuit of the GPU. In such circumstances, the encoding process to the remaining (N-P) channels of video data can be executed by the CPU. The value of P may be an empirical value or an experimental value. For example, after experiments, it is guaranteed that the requirements for the real-time performance can be met when the P channels of video data are encoded by the GPU. If the requirements for the real-time performance cannot be met when (P+1) channels of video data are encoded by the GPU, the value of P is taken as the number of the channels of which the encoding process are performed by the GPU. Alternatively, after experiments, it is determined that the overall processing rate is the highest when the P channels of video data is encoded by the GPU and the remaining (N-P) channels of video data is encoded by the CPU. In such circumstances, the value of P is taken as the number of the channels of which the encoding process are performed by the GPU. Needless to say, various manners may also be adopted, which are not listed exhaustively herein.

Likewise, whether the requirements for the real-time performance are met can be reflected in a relationship between a process rate of the encoding process performed by the GPU and an input frame rate of the mapped video data. For example, if the process rate of the encoding process performed by the GPU is greater than or equal to the input frame rate, it is considered that the requirements for the real-time performance can be met; otherwise, the requirements for the real-time performance cannot be met. Alternatively, whether the requirements for the real-time performance are met can also be reflected in a status of a cache queue for caching the mapped video data. The mapped video data is sent to the cache queue. The encoding hardware acceleration circuit of the GPU reads frame by frame, from the cache queue, the video data for the encoding process. If the congestion of the cache queue reaches a certain level, it can be considered that the requirements for the real-time performance cannot be met.

In addition to the empirical value or experimental value, in some embodiments, the value of P may also be flexibly determined by the CPU according to the practical processing capacity of the GPU. For example, the CPU can monitor the resource occupancy rate of the GPU. If the resource occupancy rate reaches a preset resource occupancy rate threshold when the GPU performs the encoding process for the P channels of video data, the CPU is configured to take over the encoding process for the remaining (N-P) channels of video data.

As discussed in the above description, the part(s) in the decoding, the mapping, and the encoding processed by the GPU may be determined based on experience or previous test results. Alternatively, the part(s) in the decoding, the mapping, and the encoding processed by the GPU may also be dynamically determined at least according to one or more video attributes, such as the resolution of the video, the format of the video, etc., or a processing capacity of the GPU. The former manner can be relatively simply implemented and can effectively improve the processing efficiency. The latter manner is more focused on the real-time performance, which can perform dynamic adjustments more flexibly according to the video or the performance of the GPU during the process. The latter manner can make full and reasonable utilization of resources and powerful processing capacity of the GPU, and meet requirements on the real-time performance of the panoramic video to a greater extent. Various embodiments will be discussed in further detail below.

It can be seen from the above technical solution that, in some embodiments of the present disclosure, one or more parts or all of the decoding, the mapping, and the encoding during the transcoding of the panoramic video are executed by the GPU. Compared with transcoding a panoramic video by a pure CPU architecture, accelerating the transcoding of the panoramic video by GPU resources provides an improved real-time performance. Therefore, requirements for VR video live broadcasting can be met.

Figure 2:
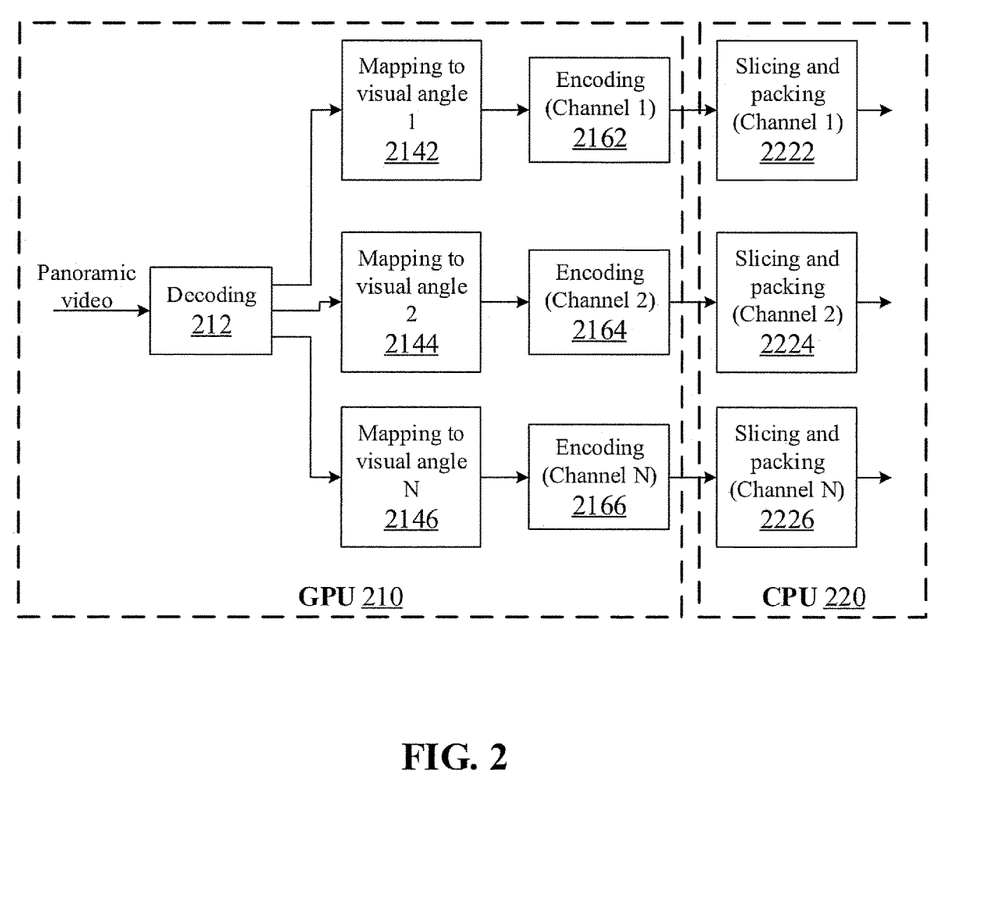
FIG. 2 is an exemplary schematic diagram illustrating a first type of video transcoding according to some embodiments of the present disclosure.

FIG. 2 is an exemplary schematic diagram illustrating a first type of video transcoding according to some embodiments of the present disclosure. As shown in FIG. 2, in the embodiments in FIG. 2, a GPU 210 executes the processes of decoding a panoramic video in operation 212. GPU 210 further executes mapping the decoded video data to N visual angles in operations 2142, 2144, 2146, and encoding the N channels of mapped video data respectively in operations 2162, 2164, 2166. CPU 220 executes the processes of slicing and packing the N channels of encoded video streams in operations 2222, 2224, 2226.

Figure 3:
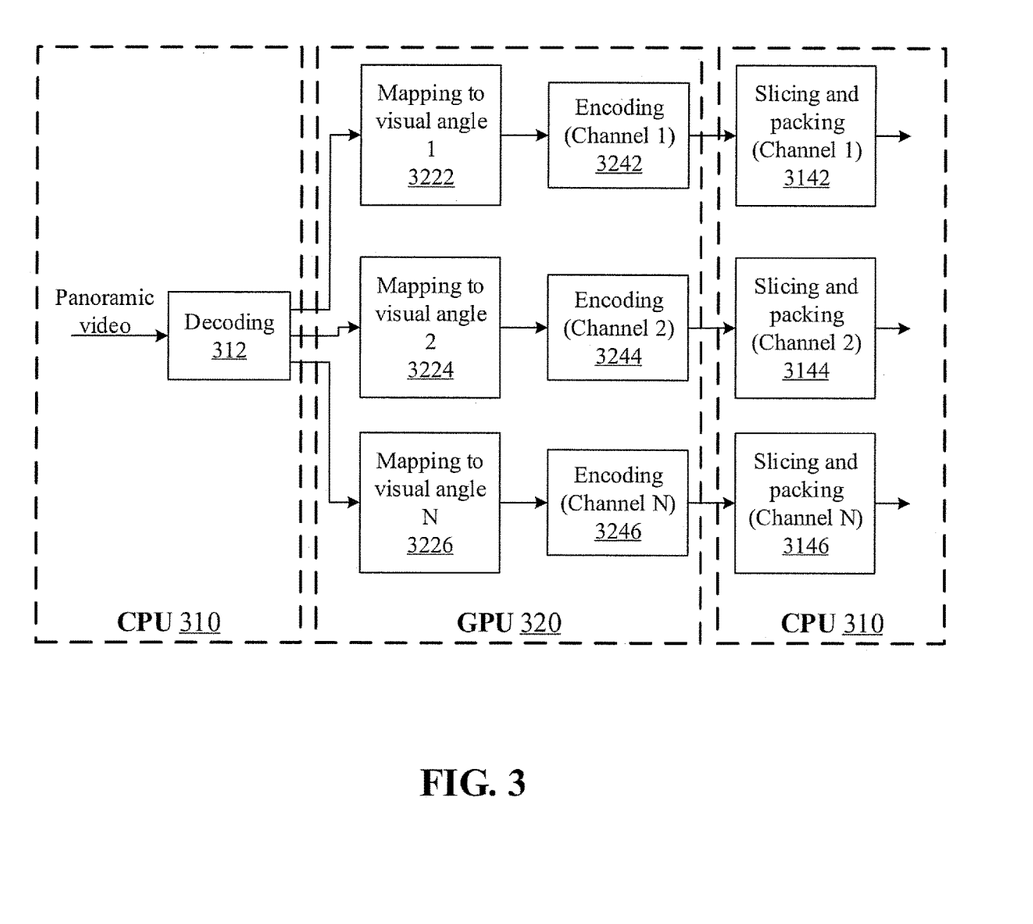
FIG. 3 is an exemplary schematic diagram illustrating a second type of video transcoding according to some embodiments of the present disclosure.

FIG. 3 is an exemplary schematic diagram illustrating a second type of video transcoding according to some embodiments of the present disclosure. As shown in FIG. 3, in the embodiments in FIG. 3, a CPU 310 executes the processes of decoding a panoramic video in operation 312. GPU 320 executes the processes of mapping the decoded video data to N visual angles in operations 3222, 3224, 3226 and encoding the N channels of mapped video data in operations 3242, 3244, 3246. The CPU 310 further executes the processes of slicing and packing the N channels of encoded video streams in operations 3142, 3144, 3146.

Figure 4:
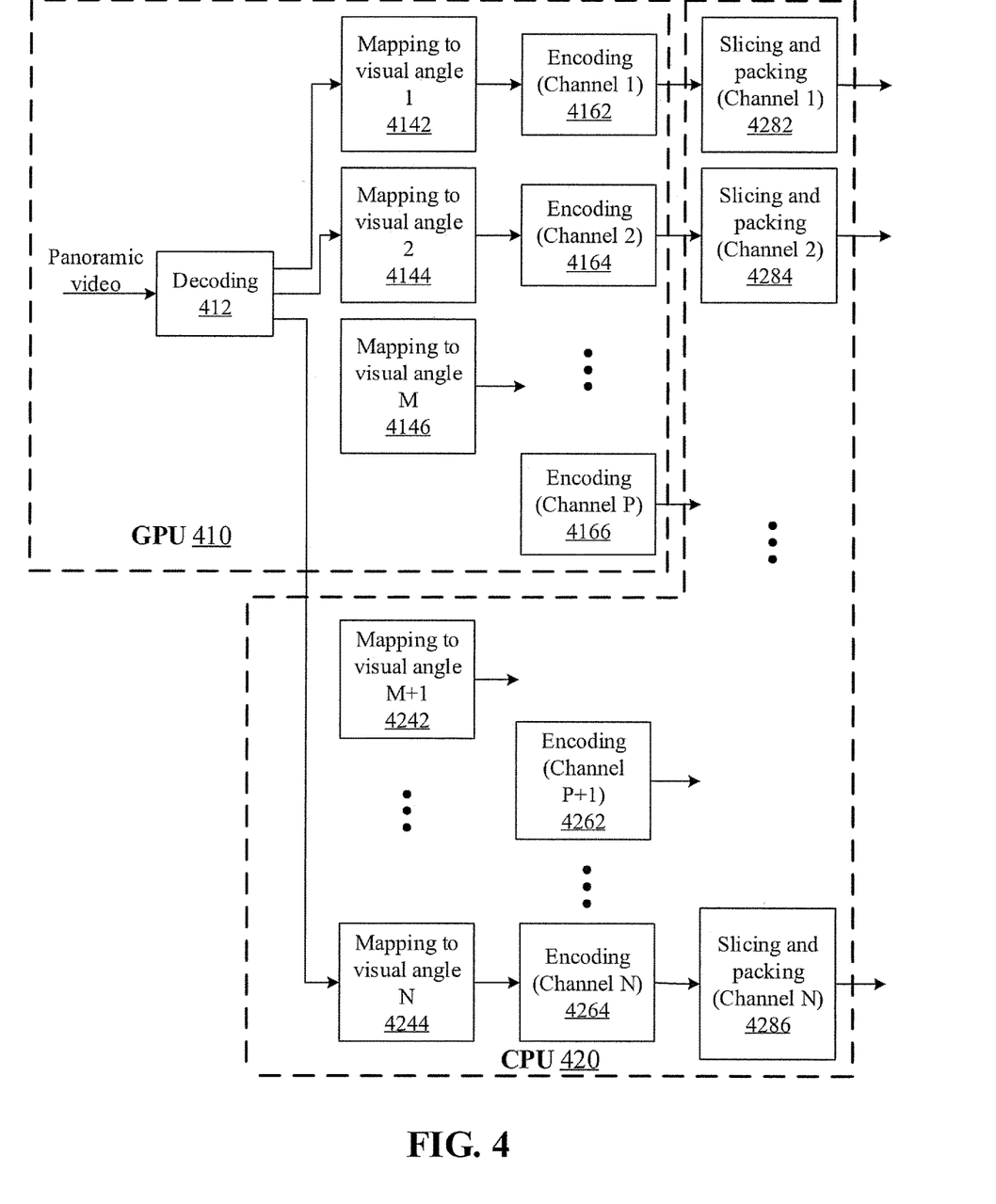
FIG. 4 is an exemplary schematic diagram illustrating a third type of video transcoding according to some embodiments of the present disclosure.

FIG. 4 is an exemplary schematic diagram illustrating a third type of video transcoding according to some embodiments of the present disclosure. As shown in FIG. 4, in the embodiments in FIG. 4, GPU 410 executes the processes of decoding a panoramic video in operation 412 and mapping the decoded video data to M visual angles in operations 4142, 4144, 4146. CPU 420 executes the processes of mapping the decoded video data to the remaining (N-M) visual angles in operations 4242, 4244. The GPU 410 further executes the processes of encoding P channels among the N channels of mapped video data in operations 4162, 4164, 4166. The CPU 420 further executes the processes of encoding the remaining (N-P) channels in operations 4262, 4264, and the processes of slicing and packing the N channels of encoded video streams in operations 4282, 4284, 4286.

While exemplary embodiments are listed and described above, it is not intended that these embodiments describe all possible forms of the disclosure. For the present disclosure, an architecture combining a CPU and a GPU is flexible and able to flexibly configure processing tasks according to the processing capacity of the GPU and of the CPU. Thus, the resource utilization of the GPU and of the CPU can be optimized to accelerate transcoding of the panoramic video and improve the real-time performance. It is not only suitable for a virtual reality (VR) video on demand (VOD) system, but also can meet the requirements for the real-time performance of a VR live broadcasting system.

The transcoding methods discussed above can be applied to a panoramic video system, such as a VR video system. The panoramic video system generally includes a client and a service provider. The service provider is configured to send panoramic video data of a video to the client. The client is configured to receive and play the panoramic video data. The transcoding methods provided by the embodiments of the present disclosure can be implemented at the service provider. In some embodiments, the service provider may be located at a server side. That is, the panoramic video data can be sent by the server side. In some embodiments, the service provider may also be located at a user equipment side. For example, if a user equipment can provide the panoramic video data, the panoramic video data may also be provided by the user equipment as the service provider.

The methods provided in various embodiments of the present disclosure are described above. The apparatuses provided in various embodiments of the present disclosure will be described below in detail.

Figure 5:
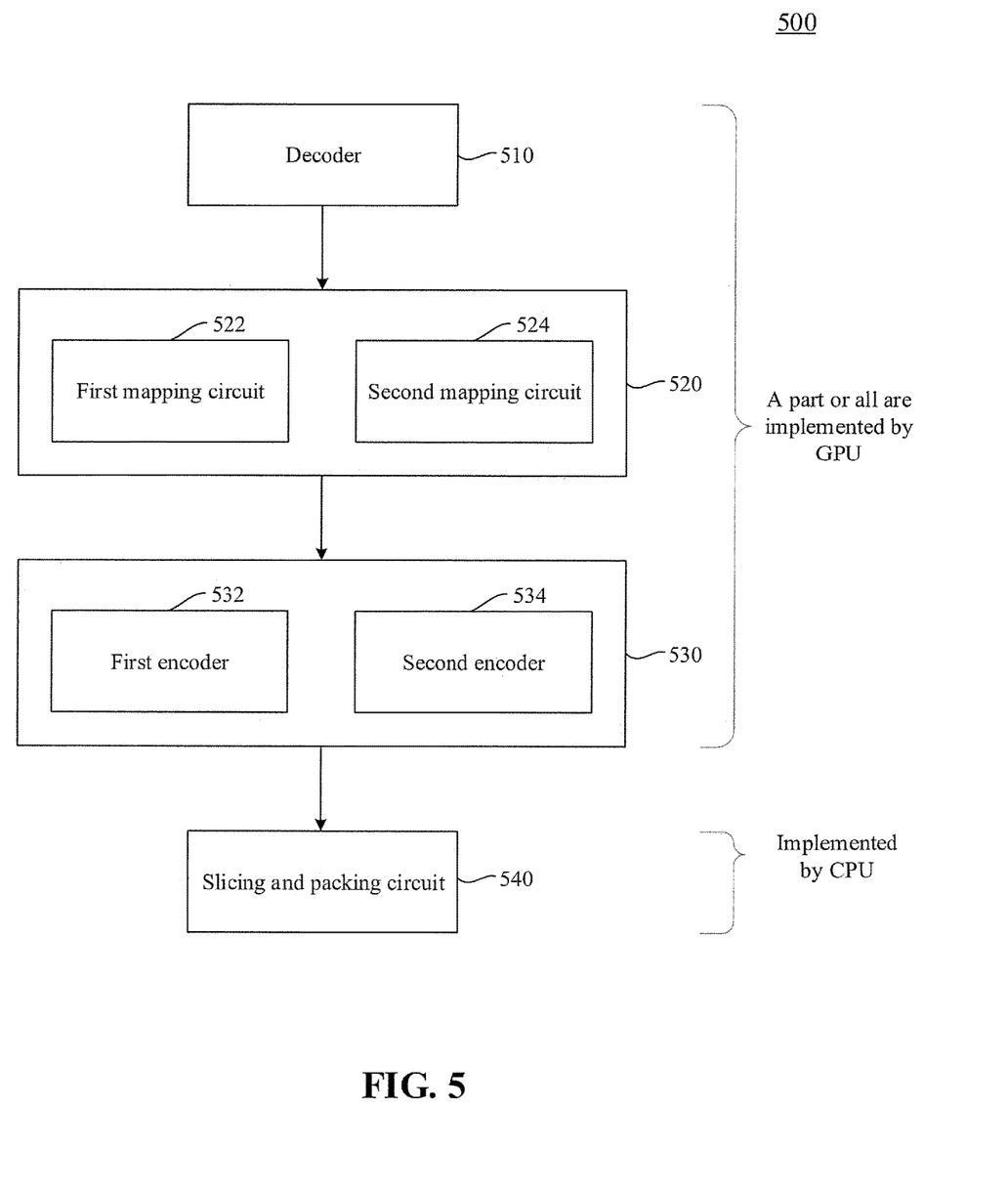
FIG. 5 is a structural diagram illustrating an exemplary apparatus according to some embodiments of the present disclosure.

FIG. 5 is a structural diagram of an apparatus 500 according to some embodiments of the present disclosure. As shown in FIG. 5, the apparatus 500 may include a decoder 510, a mapping circuit 520, an encoder 530, and a slicing and packing circuit 540. One or more parts or all of the decoder 510, the mapping circuit 520, and the encoder 530 are implemented by a GPU. In some embodiments, at least a part of the mapping circuit 520 is implemented by the GPU. In some embodiments, the part(s) of the decoder 510, the mapping circuit 520, and the encoder 530 implemented by the GPU may be determined according to one or more video attributes or the processing capacity of the GPU.

The decoder 510 is configured to decode a panoramic video. The panoramic video may be obtained from a video source of the panoramic video, or may also be panoramic video data in a local storage.

The mapping circuit 520 is configured to map the decoded video data to N visual angles, to obtain N channels of video data. The N visual angles are preset, and N is a preset positive integer that is usually greater than or equal to 2. In other words, one channel of the panoramic video is transformed into N channels of video data respectively at different visual angles.

The encoder 530 is configured to encode the N channels of video data respectively to obtain N channels of video streams.

The slicing and packing circuit 540 is configured to slice and pack the N channels of video streams respectively.

If the decoder 510 is implemented by the GPU, the decoder 510 can be specifically implemented by a decoding hardware acceleration circuit of the GPU. However, in some embodiments, if the resolution of the panoramic video exceeds the processing capacity of the GPU, the decoding can be executed by the CPU due to the limited processing capacity of the GPU. In some embodiments of the present disclosure, if the resolution of the panoramic video is higher than a preset first threshold, the decoder 510 is implemented by the CPU; otherwise, the decoder 510 is implemented by the GPU.

The mapping circuit 520 can be executed by a computing circuit in the GPU. However, there may a large number of visual angles that need to be mapped such that mapping the decoded video data to M visual angles of the total N visual angles consumes almost all the resources of the computing circuit of the GPU. In such circumstances, the mapping process of the remaining (N-M) visual angles can be performed by the CPU. Specifically, the mapping circuit 520 may include a first mapping circuit 522 and a second mapping circuit 524.

The first mapping circuit 522 is configured to map the decoded video data to M visual angles, in which M is smaller than or equal to N. The second mapping circuit 524 is configured to map the decoded video data to the remaining (N-M) visual angles. The first mapping circuit 522 is implemented by the GPU, and the second mapping circuit 524 is implemented by the CPU.

The value of M may be an empirical value or an experimental value. For example, after experiments, it is guaranteed that the requirements for the real-time performance can be met when the decoded video data is mapped to M visual angles by the GPU. If the requirements for the real-time performance cannot be met when the decoded video data is mapped to (M+1) visual angles by the GPU, the value of M is taken as the number of the visual angles of which the mapping process are performed by the GPU. Alternatively, after experiments, it is determined that the overall processing rate is the highest when the decoded video data is mapped to M visual angles by the GPU and mapped to the remaining visual angles by the CPU. In such circumstances, the value of M is taken as the number of the visual angles of which the mapping process are performed by the GPU. Needless to say, various manners may also be adopted, which are not listed exhaustively herein.

In addition to the empirical value or experimental value, in some embodiments, the value of M may also be flexibly determined by the CPU according to the practical processing capacity of the GPU. For example, the CPU can monitor the resource occupancy rate of the GPU. If the resource occupancy rate reaches the preset resource occupancy rate threshold when the GPU performs the mapping process for the M visual angles, the CPU is configured to take over the mapping process for the remaining (N-M) visual angles.

The encoder 530 may be implemented by the encoding hardware acceleration circuit of the GPU. The resolution of each channel of video data after the mapping is significantly reduced and usually within the processing capacity of the GPU. However, in some embodiments, if the resolution of each channel of video data after the mapping still exceeds the processing capacity of the GPU, the CPU can perform the encoding of each channel of video data. In some embodiments of the present disclosure, whether the resolution of each channel of video data after the mapping is higher than a preset second threshold can be determined. The second threshold refers to the highest resolution of the video data that can be encoded by the GPU and is determined by the practical processing capacity of the GPU.

In addition, even if the resolution of each channel of video data is within the processing capacity of the GPU, the encoding process to P channels of video data may consume almost all the resources of the encoding hardware acceleration circuit of the GPU. In such circumstances, the encoding process to the remaining (N-P) channels of video data can be executed by the CPU. Specifically, the encoder 530 may include a first encoder 532 and a second encoder 534.

The first encoder 532 is configured to encode P channels of video data, in which P is smaller than or equal to N. The second encoder 534 is configured to encode the remaining (N-P) channels of video data. The first encoder 532 is implemented by the GPU, and the second encoder 534 is implemented by the CPU.

The value of P may be an empirical or experimental value. For example, after experiments, it is guaranteed that the requirements for the real-time performance can be met when the P channels of video data are encoded by the GPU. If the requirements for the real-time performance cannot be met when (P+1) channels of video data are encoded by the GPU, the value of P is taken as the number of the channels of which the encoding process are performed by the GPU. Alternatively, after experiments, it is determined that the overall processing rate is the highest when the P channels of video data is encoded by the GPU and the remaining (N-P) channels of video data is encoded by the CPU. In such circumstances, the value of P is taken as the number of the channels of which the encoding process are performed by the GPU. Needless to say, various manners may also be adopted, which are not listed exhaustively herein.

In addition to the empirical or experimental value, in some embodiments, the value of P may also be flexibly determined by the CPU according to the practical processing capacity of the GPU. For example, the CPU can monitor the resource occupancy rate of the GPU. If the resource occupancy rate reaches a preset resource occupancy rate threshold when the GPU performs the encoding process for the P channels of video data, the CPU is configured to take over the encoding process for the remaining (N-P) channels of video data.

The slicing and packing circuit 540 discussed above can be implemented by the CPU.

Figure 6:
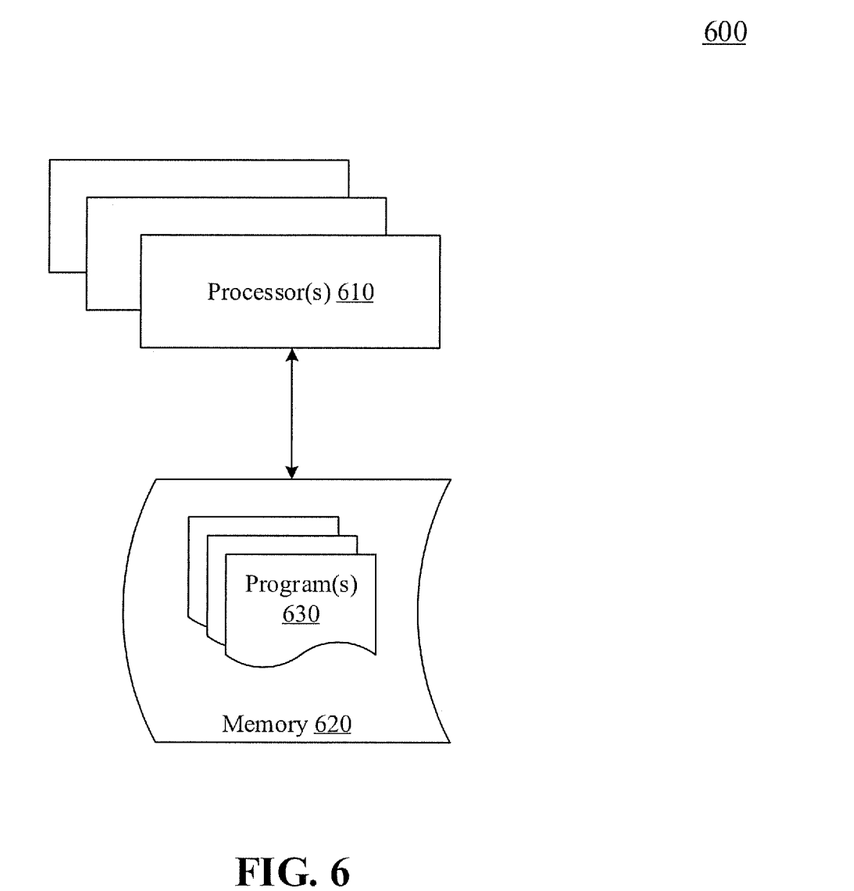
FIG. 6 is a structural diagram of an exemplary device according to some embodiments of the present disclosure.

The methods and apparatuses provided in the embodiments of the present disclosure may be realized by computer programs configured and running in a device. FIG. 6 is a structural diagram of an exemplary device 600 according to some embodiments of the present disclosure. As shown in FIG. 6, the device 600 may include one or more processors 610, and further include a memory 620 and one or more programs 630. The one or more programs 630 are stored in the memory 620 and configured to be executed by the processor(s) 610 to implement procedures of the methods or operations of the apparatuses shown in the above embodiments of the present disclosure. For example, the process of the method executed by the one or more processors 610 may include: decoding a panoramic video; mapping, at least partly using GPU(s), the decoded video data to N visual angles, to obtain N channels of video data, in which N is a preset positive integer; encoding the N channels of video data respectively to obtain N channels of video streams; and slicing and packing the N channels of video streams respectively. The processor(s) 610 include a CPU and one or more GPUs, in which one or more parts or all of the decoding, the mapping, and the encoding are executed by the GPU(s).

An application scenario applicable to the embodiments of the present disclosure is provided and discussed below. In a VR video live broadcasting system, a VR video server can utilize a CPU-GPU combination approach to transcode a VR panoramic video, and then send the transcoded VR video stream to a VR video client. In the VR video server, the decoding, the mapping, and the encoding are reasonably allocated to be executed by the GPU(s) or by the GPU(s) and the CPU working in conjunction, in order to meet requirements for the real-time performance of VR panoramic video live broadcasting.

In various embodiments provided in the present disclosure, it should be understood that the systems, apparatuses, and methods disclosed herein may be implemented in other manners. For example, the apparatuses described in above embodiments are merely by example. For example, division of the circuits or of the units is merely division of logical functions, and division in different manners may be utilized in actual implementations.

The units, which are described above as separate components, may be or may not be physically separated. Components shown or described as units may be or may not be physical units. That is, these components may be located in one place, or may be distributed in multiple network units. Some or all of the units may be selected according to actual needs to achieve one or more objectives of the embodiments in the present disclosure.

In addition, functional units in the embodiments of the present disclosure may be integrated into one processing unit, or each of the units may exist alone physically, or two or more units may be integrated into one unit. The aforementioned integrated units may be implemented in hardware or may also be implemented in hardware in conjunction with software function unit(s).

Furthermore, embodiments of the present disclosure may take the form of a computer program product embodied in one or more computer-readable medium that may be used for storing computer-readable program codes. Based on such an understanding, the technical solutions of the present disclosure can be implemented in a form of a software product. The above integrated unit implemented in one or more software functional units may be stored in a volatile or non-volatile computer-readable storage medium. The software functional unit(s) are stored in a storage medium, and include a set of instructions used for instructing a computer device (which may be a computer, a server, a network device, or the like) or a processor to perform a part of the steps of the method(s) described in the embodiments of the present disclosure. The foregoing storage medium includes a USB drive, a removable hard disk, a Read-Only Memory (ROM), a Random Access Memory (RAM), a magnetic disk, an optical disc, or other media that can store program codes. Common forms of non-transitory media include, for example, a floppy disk, a flexible disk, hard disk, solid state drive, magnetic tape, or any other magnetic data storage medium, a CD-ROM, any other optical data storage medium, a RAM, a PROM, and EPROM, a FLASH-EPROM or any other flash memory, NVRAM any other memory chip or cartridge, and networked versions of the same.

The above descriptions are merely embodiments of the present disclosure, and not meant to limit the present disclosure. Any modifications, equivalent replacements, or improvements made within the spirit and principle of the present disclosure should fall within the protection scope of the present disclosure.

The present disclosure may be described in a general context of computer-executable commands or operations, such as a program module, stored on a computer-readable medium and executed by a computing device or a computing system, including at least one of a microprocessor, a processor, a central processing unit (CPU), a graphics processing unit (GPU), etc. In general, the program module may include routines, procedures, objects, components, data structures, processors, memories, and the like for performing specific tasks or implementing a sequence of steps or operations.

Embodiments of the present disclosure may be embodied as a method, an apparatus, a device, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above.

Various functional components or blocks have been described herein. As will be appreciated by persons skilled in the art, the functional blocks may be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

In general, the word "module," as used in this document, can be a packaged functional hardware unit designed for use with other components (e.g., portions of an integrated circuit) or a part of a program (stored on a computer-readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, or can be invoked in response to detected events or interrupts. Software modules configured for execution on computing devices can be provided on a computer-readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, or can be comprised of programmable units, such as programmable gate arrays or processors. The modules or computing device functionality described herein are preferably implemented as software modules but can be represented in hardware or firmware. Generally, the modules described herein refer to logical modules that can be combined with other modules or divided into sub-modules despite their physical organization or storage.

It should also be noted that, the relational terms such as "first" and "second" are only used to distinguish an entity or operation from another entity or operation and do necessarily require or imply that any such actual relationship or order exists among these entities or operations. As used herein, the terms "include," "comprise," and their grammatical variants are intended to be non-limiting, such that recitation of items in a list is not to the exclusion of other like items that can be substituted or added to the listed items.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A panoramic video transcoding method involving a central processing unit (CPU) and a graphics processing unit (GPU), comprising:
   decoding a panoramic video using the GPU or the CPU, wherein the panoramic video is decoded by the CPU in response to a resolution of the panoramic video being higher than a preset first threshold and is decoded by the GPU in response to the resolution of the panoramic video not being higher than the preset first threshold;
   mapping, at least partly using the GPU, decoded video data to N visual angles, to obtain N channels of video data, wherein N is more than 1;
   encoding the N channels of video data respectively to obtain N channels of video streams; and
   slicing and packing the N channels of video streams respectively.

2. The panoramic video transcoding method of claim 1, further comprising:
   determining, based on at least a video attribute or a processing capacity of the GPU, that a part of the decoding, the mapping, and the encoding is processed by the GPU.

3. The panoramic video transcoding method of claim 1, wherein mapping the decoded video data to the N visual angles comprises:
   mapping the decoded video data to M visual angles by the GPU, wherein M is smaller than or equal to N; and
   mapping the decoded video data to remaining N-M visual angles by the CPU.

4. The panoramic video transcoding method of claim 1, wherein encoding the N channels of video data respectively comprises:
   encoding P channels of video data by the GPU, wherein P is smaller than or equal to N; and
   encoding remaining N-P channels of video data by the CPU.

5. The panoramic video transcoding method of claim 1, wherein if the encoding is executed by the GPU, the encoding is executed by an encoding hardware acceleration circuit in the GPU;
   if the mapping is executed by the GPU, the mapping is executed by a computing circuit in the GPU; and
   if the decoding is executed by the GPU, the decoding is executed by a decoding hardware acceleration circuit in the GPU.

6. A panoramic video transcoding device having a central processing unit (CPU) and a graphics processing unit (GPU), the panoramic video transcoding device comprising:
   a decoder configured to decode a panoramic video, wherein
      if a resolution of the panoramic video is higher than a preset first threshold, the decoder is implemented by the CPU, and
      if the resolution of the panoramic video is not higher than the preset first threshold, the decoder is implemented by the GPU;
   a mapping circuit configured to map decoded video data to N visual angles, to obtain N channels of video data, wherein N is more than 1, and at least a part of the mapping circuit is implemented by the GPU;
   an encoder configured to encode the N channels of video data respectively to obtain N channels of video streams; and
   a slicing and packing circuit, wherein the slicing and packing circuit is configured to slice and pack the N channels of video streams respectively.

7. The panoramic video transcoding device of claim 6, wherein a part of the decoder, the mapping circuit, and the encoder implemented by the GPU is determined based on at least a video attribute or a processing capacity of the GPU.

8. The panoramic video transcoding device of claim 6, wherein the mapping circuit comprises:
   a first mapping circuit configured to map the decoded video data to M visual angles, wherein M is smaller than or equal to N; and
   a second mapping circuit configured to map the decoded video data to remaining N-M visual angles,
   wherein the first mapping circuit is implemented by the GPU, and the second mapping circuit is implemented by the CPU.

9. The panoramic video transcoding device of claim 6, wherein the encoder comprises:
   a first encoder configured to encode P channels of video data, wherein P is smaller than or equal to N; and
   a second encoder configured to encode remaining N-P channels of video data,
   wherein the first encoder is implemented by the GPU, and the second encoder is implemented by the CPU.

10. A processing apparatus, comprising:
   a graphics processing unit (GPU) and a central processing unit (CPU);
   a memory; and
   one or more programs stored in the memory and executed by the GPU or the CPU to perform following operations:
   decoding a panoramic video, wherein the panoramic video is decoded by the CPU in response to a resolution of the panoramic video being higher than a preset first threshold and is decoded by the GPU in response to the resolution of the panoramic video not being higher than the preset first threshold;

mapping, at least partly using the GPU, decoded video data to N visual angles, to obtain N channels of video data, wherein N is more than 1;

encoding the N channels of video data respectively to obtain N channels of video streams; and slicing and packing the N channels of video streams respectively.

11. A non-transitory computer-readable medium that stores a set of instructions that is executable by at least one processor of an apparatus to cause the apparatus to perform a panoramic video transcoding method involving a central processing unit (CPU) and a graphics processing unit (GPU), the panoramic video transcoding method comprising:

decoding a panoramic video, wherein if a resolution of the panoramic video is higher than a preset first threshold, the panoramic video is decoded by the CPU; otherwise, the panoramic video is decoded by the GPU;

mapping, at least partly using the GPU, decoded video data to N visual angles, to obtain N channels of video data, wherein N is more than 1;

encoding the N channels of video data respectively to obtain N channels of video streams; and slicing and packing the N channels of video streams respectively.

12. The non-transitory computer-readable medium of claim 11, wherein the set of instructions that is executable by the at least one processor of the apparatus causes the apparatus to further perform:

determining, based on at least a video attribute or a processing capacity of the GPU, that a part of the decoding, the mapping, and the encoding is processed by the GPU.

13. The non-transitory computer-readable medium of claim 11, wherein the set of instructions that is executable by the at least one processor of the apparatus causes the apparatus to perform mapping the decoded video data to the N visual angles by:

mapping the decoded video data to M visual angles by the GPU, wherein M is smaller than or equal to N; and mapping the decoded video data to remaining N-M visual angles by the CPU.

14. The non-transitory computer-readable medium of claim 11, wherein the set of instructions that is executable by the at least one processor of the apparatus causes the apparatus to perform encoding the N channels of video data respectively by:

encoding P channels of video data by the GPU, wherein P is smaller than or equal to N; and encoding remaining N-P channels of video data by the CPU.

15. The non-transitory computer-readable medium of claim 11, wherein if the encoding is executed by the GPU, the encoding is executed by an encoding hardware acceleration circuit in the GPU;

if the mapping is executed by the GPU, the mapping is executed by a computing circuit in the GPU; and if the decoding is executed by the GPU, the decoding is executed by a decoding hardware acceleration circuit in the GPU.

16. The processing apparatus of claim 10, wherein the one or more programs are stored in the memory and executed by the GPU or the CPU to further perform operations of:

determining, at least according to one or more video attributes or a processing capacity of the GPU, a part of the decoding, the mapping, and the encoding that is processed by the GPU.

17. The processing apparatus of claim 10, wherein if a resolution of the panoramic video is higher than a preset first threshold, the panoramic video is decoded by the CPU; and if the resolution of the panoramic video is not higher than the preset first threshold, the panoramic video is decoded by the GPU.

18. The processing apparatus of claim 10, wherein mapping the decoded video data to the N visual angles comprises:

mapping the decoded video data to M visual angles by the GPU, wherein M is smaller than or equal to N; and mapping the decoded video data to remaining N-M visual angles by the CPU.

19. The processing apparatus of claim 10, wherein encoding the N channels of video data respectively comprises:

encoding P channels of video data by the GPU, wherein P is smaller than or equal to N; and encoding remaining N-P channels of video data by the CPU.

20. The processing apparatus of claim 10, wherein if the encoding is executed by the GPU, the encoding is executed by an encoding hardware acceleration circuit in the GPU;

if the mapping is executed by the GPU, the mapping is executed by a computing circuit in the GPU; and if the decoding is executed by the GPU, the decoding is executed by a decoding hardware acceleration circuit in the GPU.

\* \* \* \* \*